(12) United States Patent
Cribiu'

(10) Patent No.: US 6,398,011 B1
(45) Date of Patent: Jun. 4, 2002

(54) CONVEYOR WITH SUPPORTING DEVICE FOR A GOODS CONTAINER

(75) Inventor: Oreste Cribiu', Gerenzano (IT)

(73) Assignee: Construzioni Meccaniche Crizaf, Saronno (IT)

( * ) Notice: Subject to any disclaimer, the term of this patent is extended or adjusted under 35 U.S.C. 154(b) by 4 days.

(21) Appl. No.: 09/628,344

(22) Filed: Jul. 28, 2000

(30) Foreign Application Priority Data

Aug. 10, 1999 (EP) .............................................. 99830520

(51) Int. Cl.[7] .............................................. B65G 65/04
(52) U.S. Cl. ........................ 198/522; 198/536; 198/538; 198/711
(58) Field of Search ................................ 198/522, 536, 198/538, 539, 711, 866, 508, 435, 598

(56) References Cited

U.S. PATENT DOCUMENTS

| 117,804 | A | * | 8/1871 | Newman | 198/396 |
|---|---|---|---|---|---|
| 881,741 | A | * | 3/1908 | Stroschein | 198/496 |
| 1,885,935 | A | * | 11/1932 | McAllister | 198/496 |
| 3,140,770 | A | * | 7/1964 | Herring et al. | 198/7 |
| 4,062,168 | A | * | 12/1977 | Watts et al. | 53/64 |
| 4,098,390 | A | * | 7/1978 | Calvet | 198/396 |

FOREIGN PATENT DOCUMENTS

DE 44 28 826 2/1996

* cited by examiner

*Primary Examiner*—Christopher P. Schwartz
*Assistant Examiner*—Benjamin A Pezzlo
(74) *Attorney, Agent, or Firm*—Nixon & Vanderhye; Frank P. Presta

(57) ABSTRACT

The conveyor according to the invention provides a supporting device for goods containers positioned in the rear part of an inclined surface of the conveyor. The supporting device provides a supporting surface that can be moved vertically and horizontally with respect to the ground in order to adapt to the different types and sizes of the containers to be supported.

4 Claims, 3 Drawing Sheets

CONVEYOR WITH SUPPORTING DEVICE FOR A GOODS CONTAINER

The present invention refers to a conveyor with a supporting device for a container apt to receive the goods conveyed by the conveyor. In the present invention reference is made in particular to a conveyor of the type for taking pieces from a low-level surface and conveying them toward a higher loading area. Said type of conveyor is particularly suitable to be used for molded plastic goods produced by normal molding machines; however, it can find use in many other fields of application.

For taking pieces from a low-level surface and conveying them toward a higher loading area, use is made of conveyors provided with an endless belt disposed horizontally in a first portion for loading of the pieces and inclined in a second portion for raising thereof. On reaching the top of the inclined surface of the conveyor, the pieces are allowed to drop into containers or collecting boxes and then conveyed to storage or toward other processing stages.

At present the containers for collecting the pieces conveyed by the conveyor are positioned behind the inclined surface of the conveyor.

Said containers, depending upon their size, must be positioned at a suitable height from the ground and at a suitable distance from the conveyor belt.

At present the conveyors according to the prior art are not provided with any supporting device for the containers for collecting the pieces, and therefore said containers are appropriately positioned behind the conveyor making use of makeshift means such as stools, platforms and the like.

It is obvious that such a method of positioning and supporting the collecting containers has various drawbacks. In fact, positioning of the containers is not precise and requires an excessive waste of time and effort on the part of the operator. Furthermore, when the size or shape of the collecting containers changes, the supporting means also have to be changed to allow the containers to be positioned correctly behind the conveyor. This means a further waste of time and resources to have different supporting elements for different types of containers.

The object of the invention is to eliminate said drawbacks by providing a conveyor with a supporting device for goods containers that is practical, versatile, economical and easy to make.

This object is achieved according to the invention with the characteristics listed in appended independent claim 1.

Preferred embodiments of the invention are apparent from the dependent claims.

The conveyor according to the invention provides a supporting device for goods containers positioned in the rear part of the inclined surface of the conveyor. Said supporting device provides a supporting surface that can be moved vertically and horizontally with respect to the ground in order to adapt to the different types and sizes of the containers to be supported.

The vertical movement allows the supporting surface to be adjusted in height. The horizontal movement, on the other hand, allows the supporting surface to be brought closer to or further away from the inclined surface of the conveyor.

The vertical movement is obtained by making the supporting surface slide along grooved guides provided on the sides of the inclined surface of the conveyor, whereas the horizontal movement is obtained by means of a system of telescopic guides.

The supporting device according to the invention further provides for a tipping system that allows the supporting surface to be placed in a position in which it occupies least space, that is to say in a position in which the supporting surface is parallel to the inclined surface of the conveyor. Said position in which it occupies least space can be used so as not to hinder work operations when large-sized containers that are positioned directly on the ground are used.

Further characteristics of the invention will be made clearer by the detailed description that follows, referring to a purely exemplary and therefore non-limiting embodiment thereof, illustrated in the appended drawings, in which.

Figure 1:
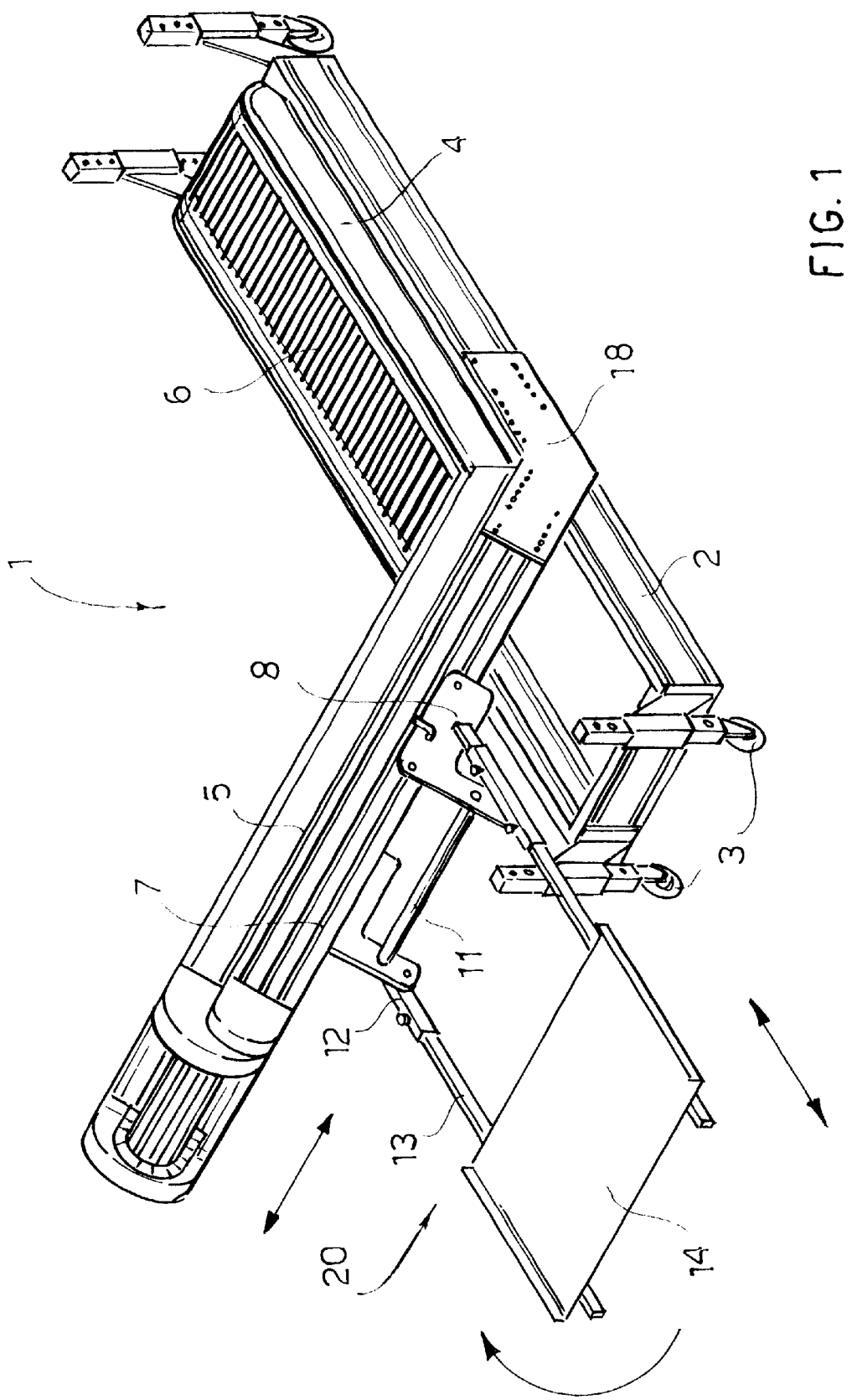
FIG. 1 is an axonometric view of a conveyor according to the invention, with a container supporting device in the working position.

FIG. 1 shows a conveyor denoted as a whole with reference numeral 1. The conveyor 1 comprises a base frame 2 shaped as a rectangular frame supported on swivel wheels 3 so that it can be moved easily.

A horizontal loading surface 4 and an inclined conveying surface 5 are mounted on the base frame 2. The horizontal surface 4 is parallel to the surface of the base frame 2, is situated at a low level and serves to receive the molded items coming from a molding machine. The inclined surface 5 is anchored to the base frame 2 by means of elbow supports 18 and serves to convey the molded items from the horizontal surface 4 toward a station at a high level.

A conveyor belt 6 is wound in an endless loop along the horizontal surface 4 and the inclined surface 5.

Grooved guides 7 are provided along the two sides of the inclined surface 5. Respective supporting plates 8 able to support a supporting device of a container suitable for receiving the pieces conveyed by the conveyor belt engage in each grooved guide 7.

Figure 3:
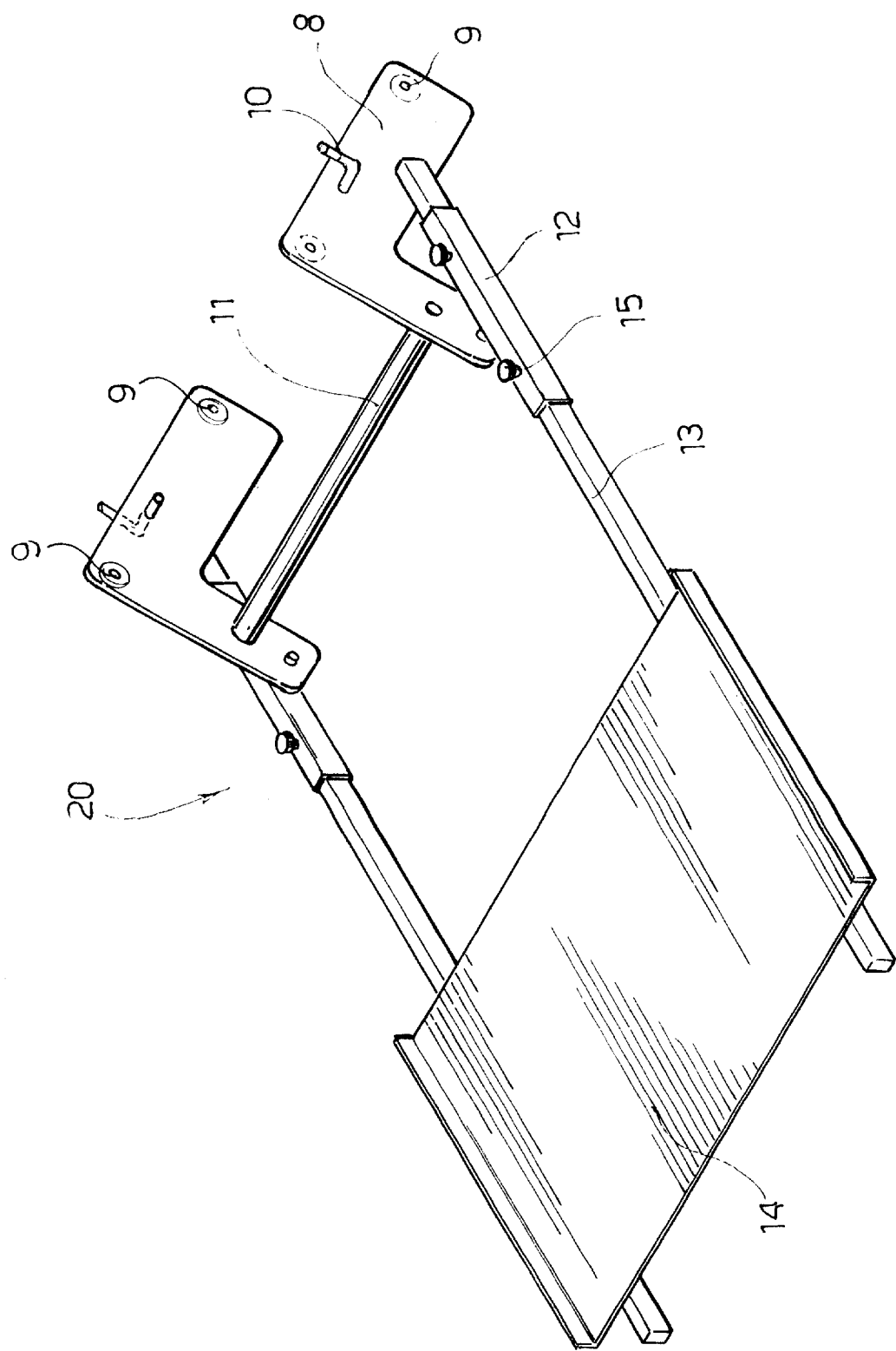
FIG. 3 is an axonometric view of the container supporting device according to the invention.

The supporting device according to the invention, indicated as a whole with reference numeral 20, is shown in greater detail in FIG. 3.

Each supporting plate 8 is substantially L-shaped. Swivel wheels 9 are mounted in each supporting plate (in FIG. 3 two wheels 9 are visible in each supporting plate 8) and are destined to slide in the respective grooved guides 7 of the inclined surface 5. Holes able to accommodate locking handles 10 are also provided in each supporting plate 8, so that the plate 8 can be locked, in a desired position, inside the respective grooved guide 7.

The two supporting plates 8 are connected to one another by means of a connecting rod 11 so that they are made integral with each other.

At the free end of each supporting plate 8 a hollow tube 12 having a substantially rectangular cross section is hinged.

Figure 2:
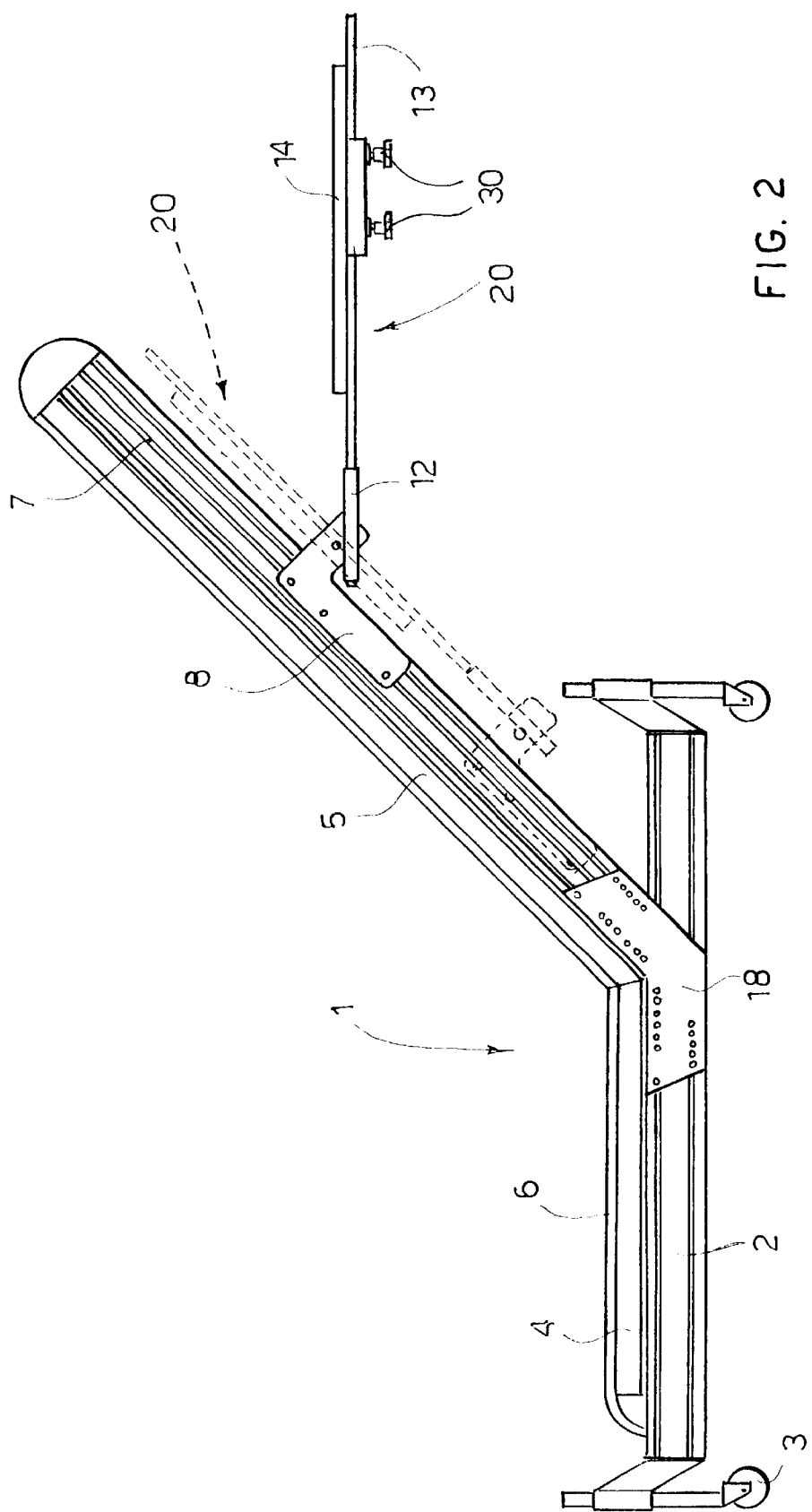
FIG. 2 is a side view of the conveyor in FIG. 1, in which the container supporting device is shown with a dashed line, in the position in which it occupies least space.

As shown in FIG. 2, the hollow tube 12 is locked in such a position that between said tube and the inclined surface 5 there is an angle equal to the angle of inclination of the inclined surface 5 with respect to the ground.

A substantially rectangular shaped supporting rod 13 is inserted inside each hollow tube 12 and can slide telescopically therein. In this manner the two supporting rods 13 are parallel to each other and can slide inside the respective hollow tubes 12. Locking handwheels 15 able to lock in position the supporting rods 13 that slide inside said hollow tubes 12 are provided.

A supporting surface 14 able to support the containers destined to receive the goods conveyed by the conveyor 1 is fixed on the supporting rods 13. In this manner the supporting surface 14 is disposed substantially parallel to the ground.

The supporting surface 14 can slide along the supporting rods 13 so as to be able to be translated horizontally. Locking handwheels 30 are provided to lock the supporting surface 14 in position on the supporting rods 13.

In order to move the supporting surface 14 vertically, the plates 8 are made to slide along the guide grooves 7 situated in the sides of the inclined surface 14; in this manner the supporting surface 14 moves up and down while remaining parallel to the ground. Once the desired position has been reached, the supporting device 20 is locked by means of the locking handle 10 which fixes the plates 8 to their respective grooved guides 7.

In order to move the supporting surface 14 horizontally, said surface is made to slide on the supporting rods 13 and/or the supporting rods 13 are made to slide inside the hollow tubes 12, so as to move the supporting surface 14 toward or away from the inclined surface 5 of the conveyor. Once the desired position has been reached, the surface 14 is locked on the rods 13 by means of handwheels 30 and the rods 13 are locked inside the hollow tubes 12 by means of the handwheels 15.

If large-sized containers which are positioned directly on the ground are used, the supporting device 20 is placed in a position in which it occupies least space, shown hatched in FIG. 2, to prevent it from hindering the container filling operation.

In order to obtain the position in which it occupies least space, the hollow tubes 12 are turned around the hinging point of the plates 8, so as to dispose the supporting surface 14 substantially parallel to the inclined surface 5.

What is claimed is:

1. A conveyor (1) comprising a substantially horizontal surface (4) disposed at a low level for loading of goods, in particular molded goods, and an inclined surface (5) for transferring said goods to a higher level where they are allowed to fall into a container, characterized in that it comprises a supporting device (20) able to support said container, disposed behind said inclined surface (5); said supporting device (20) being movably mounted on said inclined surface (5) for substantially horizontal and vertical movement, and said supporting device (20) comprising a support surface (14) movable to a position substantially parallel to the ground.

2. A conveyor according to claim 1, characterized in that said support surface (14) is carried by supporting plates (8) mounted slidingly in grooved guides (7) in the sides of said inclined surface (5), for vertical adjustment thereof.

3. A conveyor according to claim 1 characterized in that said supporting device (20) is movable to a storage position wherein said support surface (14) is adjacent to and substantially parallel to the underside of said inclined surface (5).

4. A conveyor according to claim 2 characterized in that said support surface (14) is slidably and pivotally connected to said supporting plates (8).

* * * * *